No. 837,068.
PATENTED NOV. 27, 1906.
C. A. JANSON.
MILK PASTEURIZING APPARATUS.
APPLICATION FILED OCT. 18, 1905. RENEWED MAY 16, 1906.
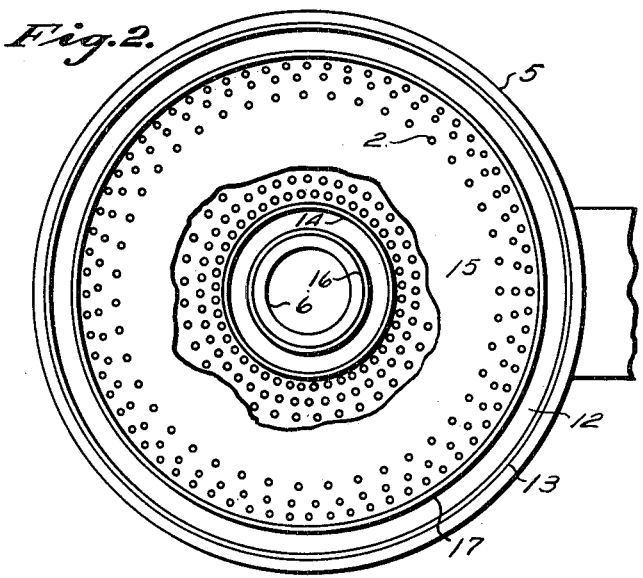
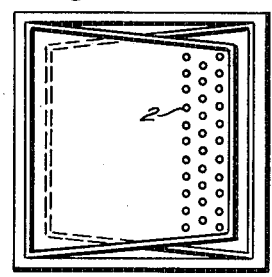
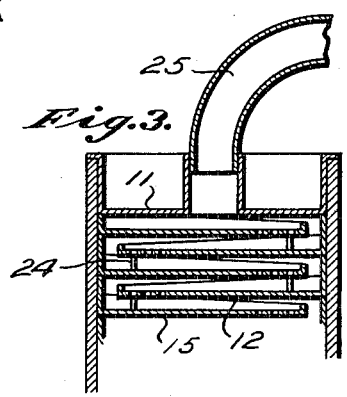
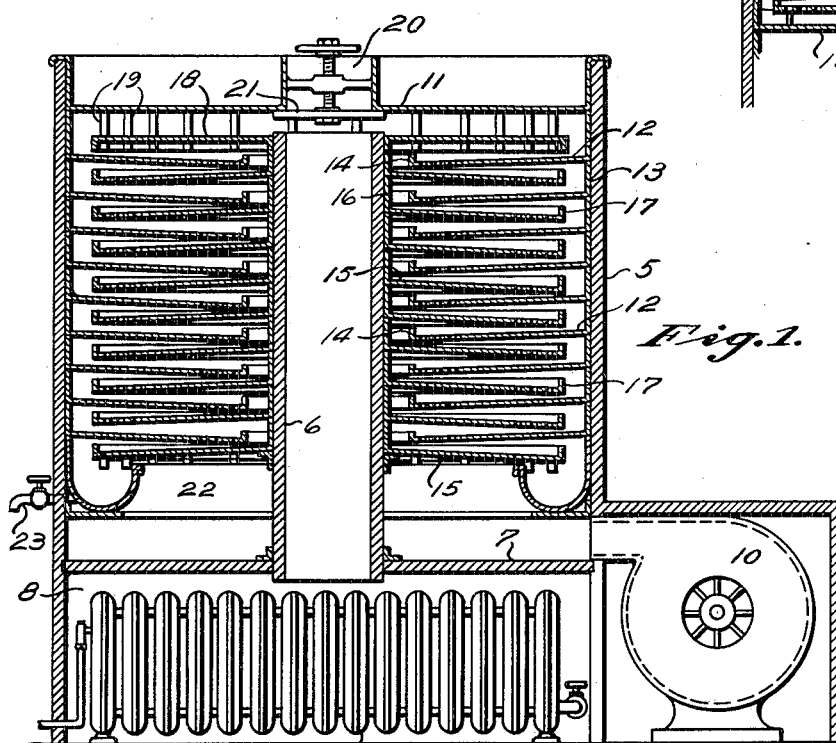

UNITED STATES PATENT OFFICE.

CARL AUGUST JANSON, OF CHICAGO, ILLINOIS.

MILK-PASTEURIZING APPARATUS.

No. 837,068.  Specification of Letters Patent.  Patented Nov. 27, 1906.

Application filed October 18, 1905. Renewed May 16, 1906. Serial No. 317,207.

*To all whom it may concern:*

Be it known that I, CARL AUGUST JANSON, a subject of the King of Sweden, and a resident of Chicago, in the county of Cook and State of Illinois, have invented certain new and useful Improvements in Milk-Pasteurizing Apparatus, of which the following is a specification.

The main objects of this invention are to provide an improved form of pasteurizing apparatus for milk in which the milk will be repeatedly subdivided into numerous fine sprays and intimately mixed with heated air and to provide an apparatus of this class in which all of its parts are readily accessible for the purpose of cleaning the same. I accomplish these objects by the device shown in the accompanying drawings, in which—

Figure 1 is a vertical section of a milk-pasteurizing apparatus constructed according to my invention. Fig. 2 is a top plan of the same with the cover removed. Fig. 3 is a vertical section, partly broken away, of a modified form of apparatus embodying my invention. Fig. 4 is a plan showing the shape of the trays in the apparatus shown in Fig. 3.

In the form shown in Figs. 1 and 2 the apparatus consists of a vertically-disposed cylindrical casing 5, having therein tubular upright 6, arranged concentrically of the walls of the casing. The upright 6 extends through the bottom 7 of the casing and communicates with an air-heater 8, provided with heating-coils 9. A blower 10 forces air from said heater into the lower part of the casing 5. The cover 11 of the casing is in the form of a pan or tank having a flange supported by the top of the casing and being adapted to hold a quantity of the liquid, such as milk, which is to be pasteurized. The interior of the casing contains a series of annular trays or shallow pans arranged one above the other, the bottoms of alternate trays being inclined in opposite directions and being perforated near their lower edges to discharge their contents to the next tray below in the form of a fine spray. The alternate trays 12 have downwardly-converging bottoms provided with outer flanges 13, fitting the walls of the casing 5. The inner edges of these trays are provided with vertical flanges 14, spaced away from the walls of the upright 6. The flanges 13 rest one upon the other for removably supporting the trays 12 in position within the casing. A second series of trays 15, having downwardly-diverging bottoms, are arranged alternately of the trays 12 and provided with inner upright flanges 16, which fit the walls of the upright 6. The outer edges of these trays are provided with upwardly-disposed flanges 17, spaced away from the walls of the casing 5. These trays are also perforated, the perforations in this case being near the outer edge of the bottom. The upper end of the upright 6 terminates below the cover 11 and communicates with the interior of the casing, so that there is thus a passage for air along the series of trays communicating at its upper end through the upright 6 with the air-heater 8. The air-heater 8 also communicates through the blower 10 with the lower end of the air-passage between the trays. A baffle-plate 18 causes the air to flow outwardly along the uppermost tray 12 before entering the air-passage in the upright 6. This baffle-plate is secured to the cover 11 by means of the tubes 19, through which the contents of said cover flow into said uppermost tray. The cover is also provided with a central air-passage 20 in alinement with the passage in the upright 6, and a gate 21 is provided which may be adjusted either against the cover or the upper end of the upright 6 for directing the flow of air. When the gate is in the position shown in Fig. 1, the air after passing along the series of trays is returned to the heater through the upright 6. If the gate is adjusted into contact with the top of the upright 6, then the air will escape through the passage 20. Fresh air will then be supplied to the heater through an air-inlet. (Not shown in the drawings.) The annular trough 22 near the bottom of the casing 5 collects the milk after the same has passed the lowest tray 15, and the milk is then discharged at the faucet 23.

In the modified form shown in Figs. 3 and 4 the casing is rectangular, and alternate trays rest upon each other at one end, as in the case of the annular trays shown in Fig. 1; but the other edge of each of said trays is provided with feet 24, which rest upon the next succeeding tray. These trays are also provided with a plurality of rows of perforations near their lower edges. The air in this case passes along the series of trays, traversing each tray in succession as in the other form; but in this case the air is returned to the heater by means of an outer air-passage 25.

In the operation of the device shown in

Figs. 1 and 2 the milk is first placed within the cover 11, from which it is discharged into the upper tray 12 through the pipes 19. The milk then flows inward on the tray 12 and is discharged through the perforations 2 into the tray 15, which is next below. Then the milk flows outward and is discharged through the perforations 2 near the outer edge of the tray 15 into the next tray 12, and so on throughout the series until it arrives at the trough 22. The blower 10 causes the heated air to flow into the lower end of the casing and then pass upward over the edges of the pans and along said pans, as indicated by the small arrows in Fig. 1. This air passes into close contact with the surface of the milk on the successive pans and also passes through the sprays of milk flowing from one pan to the next. When the air arrives at the top, it is either returned to the heater for recirculation or allowed to pass out through the passage 20, according to the setting of the gate 21. This apparatus insures the thorough treatment of the milk by means of air which has been previously heated to a pasteurizing temperature. This effects the pasteurization of the milk without giving it an undesirable taste or running the risk of burning it, as happens when the milk is heated by applying heat to the walls of the retaining vessel. This apparatus also insures that all of the milk is uniformly treated.

What I claim as my invention, and desire to secure by Letters Patent, is—

1. The combination of a casing having therein a series of trays arranged one above the other and inclined alternately in opposite directions, the bottom of each of said trays being perforated near the lower edge and adapted to discharge a plurality of fine sprays of liquid into the next pan below, an air-heater, and means for causing air from said heater to flow successively along each of said trays from end to end of the series.

2. The combination of a casing having therein a series of trays arranged one above the other and inclined alternately in opposite directions, the bottom of each of said trays being perforated near the lower edge and adapted to discharge a plurality of fine sprays of liquid into the next pan below, an air-heater, and means for causing air from said heater to flow successively along each of said trays from end to end of the series, and a return-passage for conducting air back to said heater after said air has passed along said series of trays.

3. The combination of a casing having therein a series of trays arranged one above the other and inclined alternately in opposite directions, the bottom of each of said trays being perforated near the lower edge and adapted to discharge a plurality of fine sprays of liquid into the next pan below, an air-heater, and means for causing air from said heater to flow successively along each of said trays from end to end of the series, a tank for liquid at the upper end of said casing and one or more tubes connecting said tank with the uppermost tray and adapted to discharge liquid to said tray without permitting the escape of said circulating air.

4. In a device of the class described, the combination of a vertically-disposed casing, a central upright within said casing, a series of trays having downwardly and outwardly inclined bottoms mounted on said upright, one above the other, a second series of trays mounted within the casing and having downwardly and inwardly inclined bottoms, the trays in one series alternating with those in the other and each adapted to discharge its contents in one or more fine streams into the tray next below, an air-heater and means for forcing air from said heater into one end of said casing, said trays being arranged to cause said air to flow successively along the trays and across the stream of liquid issuing therefrom.

5. In a device of the class described the combination of an upright cylindrical casing, a tubular upright secured within said casing, a series of trays having downwardly-diverging bottoms spaced apart and secured one above the other to said upright, a second series of trays having downwardly-converging bottoms secured within said casing and arranged to alternate with the trays in said first series, the trays of said first series being spaced from the walls of the casing, and the trays of the second series being spaced from the upright, so as to form a tortuous passage for air extending successively along said trays throughout the series, said air-passage communicating with the interior of said upright at the upper end of the casing, an air-heater and means for causing air to flow from said upright, through said heater and along said series of trays, means for continuously delivering milk to the uppermost tray, and a receptacle for collecting the milk discharged from the lowest of said trays.

6. In a device of the class described, the combination of an upright cylindrical casing, a tubular upright secured within said casing, a series of trays having downwardly-diverging bottoms spaced apart and secured one above the other to said upright, a second series of trays having downwardly-converging bottoms secured within said casing and arranged to alternate with the trays in said first series, the trays of said first series being spaced from the wall of the casing and the trays of the second series being spaced from the upright so as to form a tortuous passage for air extending successively along each of said trays throughout the series, said air-passage communicating with the interior of said upright at the upper end of the casing, an air-heater and means for causing air to flow from said upright through said heater and along said series of trays, means for delivering milk to the uppermost tray without disturbing the circulation of air within the casing, and a receptacle for collecting the milk discharged from the lowest of said trays, said first series of trays being provided with inner flanges fitting said upright, and adapted to rest one upon the other for removably supporting said trays within the casing, and said second series of trays being provided with outer flanges fitting the inner walls of the casing and adapted to rest one upon the other for supporting said trays within the casing.

7. In a device of the class described the combination of an upright, cylindrical casing, a tubular upright secured within said casing, a series of trays having downwardly-diverging bottoms spaced apart and secured one above the other to said upright, a second series of trays having downwardly-converging bottoms secured within said casing and arranged to alternate with the trays in said first series, the trays of said first series being spaced from the inner wall of the casing, and the trays of the outer series being spaced from the upright so as to form a tortuous passage for air extending successively along said trays throughout the series, said air-passage communicating with the interior of said upright at the upper end of the casing, an air-heater and means for causing air to flow from said upright through said heater and along said series of trays, means for delivering milk to the uppermost tray without disturbing the circulation of air within the casing, and a receptacle for collecting the milk discharged from the lowest of said trays, said first series of trays being provided with inner flanges fitting said upright, and adapted to rest one upon the other for removably supporting said trays within the casing, and said second series of trays being provided with outer flanges fitting the inner walls of the casing and adapted to rest one upon the other for supporting said trays within the casing, each of said trays having an upwardly-disposed flange extending around its lower edge and having an annular series of perforations in its bottom near said flange for causing its contents to discharge in the form of a fine spray.

8. In a device of the class described, the combination of a casing having therein a vertical series of trays inclined alternately in opposite directions each adapted to discharge into the next below, said trays resting loosely upon each other to permit of their ready removal from the casing, alternate trays extending into contact with one of the walls of said receptacle and being spaced from another wall, and the intermediate trays extending into contact with said other wall and spaced from the first wall so as to provide a continuous passage for air along said trays, an air-heater, and means for causing air from said heater to flow through said casing and along said trays.

Signed at Chicago this 13th day of October, 1905.

CARL AUGUST JANSON.

Witnesses:
 EUGENE A. RUMMLER,
 GLEN C. STEPHENS.